United States Patent
Meisenburg et al.

[11] 3,801,285
[45] Apr. 2, 1974

[54] APPARATUS FOR RECEIVING CRYSTALS

[76] Inventors: Ewald Meisenburg, Gartenstrasse 5;
Rolf Langenberg, Liebigstrasse 18,
both of Wesseling, Germany

[22] Filed: Mar. 22, 1972

[21] Appl. No.: 236,829

Related U.S. Application Data

[63] Continuation-in-part of Ser. No. 853,737, Aug. 28, 1969, abandoned.

[30] Foreign Application Priority Data
Sept. 4, 1968  Germany............................ 1794084

[52] U.S. Cl...................... 23/273 F, 62/58, 62/123
[51] Int. Cl................................................ B01d 9/04
[58] Field of Search................ 23/273 F; 62/58, 123

[56] References Cited
UNITED STATES PATENTS

| | | | |
|---|---|---|---|
| 1,464,707 | 8/1923 | Hapgood................................ | 62/58 |
| 2,603,667 | 7/1952 | Pankratz et al........................ | 23/273 |
| 3,205,078 | 9/1965 | Lund...................................... | 62/58 |
| 3,283,522 | 11/1966 | Ganiaris................................. | 62/58 |
| 3,328,972 | 7/1967 | Svanoe................................... | 23/273 |
| 3,620,034 | 11/1971 | Ganiaris................................. | 62/58 |

*Primary Examiner*—Norman Yudkoff
*Assistant Examiner*—R. T. Foster
*Attorney, Agent, or Firm*—Connolly and Hutz

[57] ABSTRACT

Apparatus for recovering crystals from a melt or solution which is introduced into a crystal paste prepared from the melt or solution having a closed-loop system of pipes containing one or more cooling zones wherein the pipes closing the system or connecting the cooling zones have about the same diameter than the pipes of the cooling zones and are relatively short. The conveying means for the paste is mounted on a common shaft with scrapers which remove the crystals from the pipe wall.

6 Claims, 1 Drawing Figure

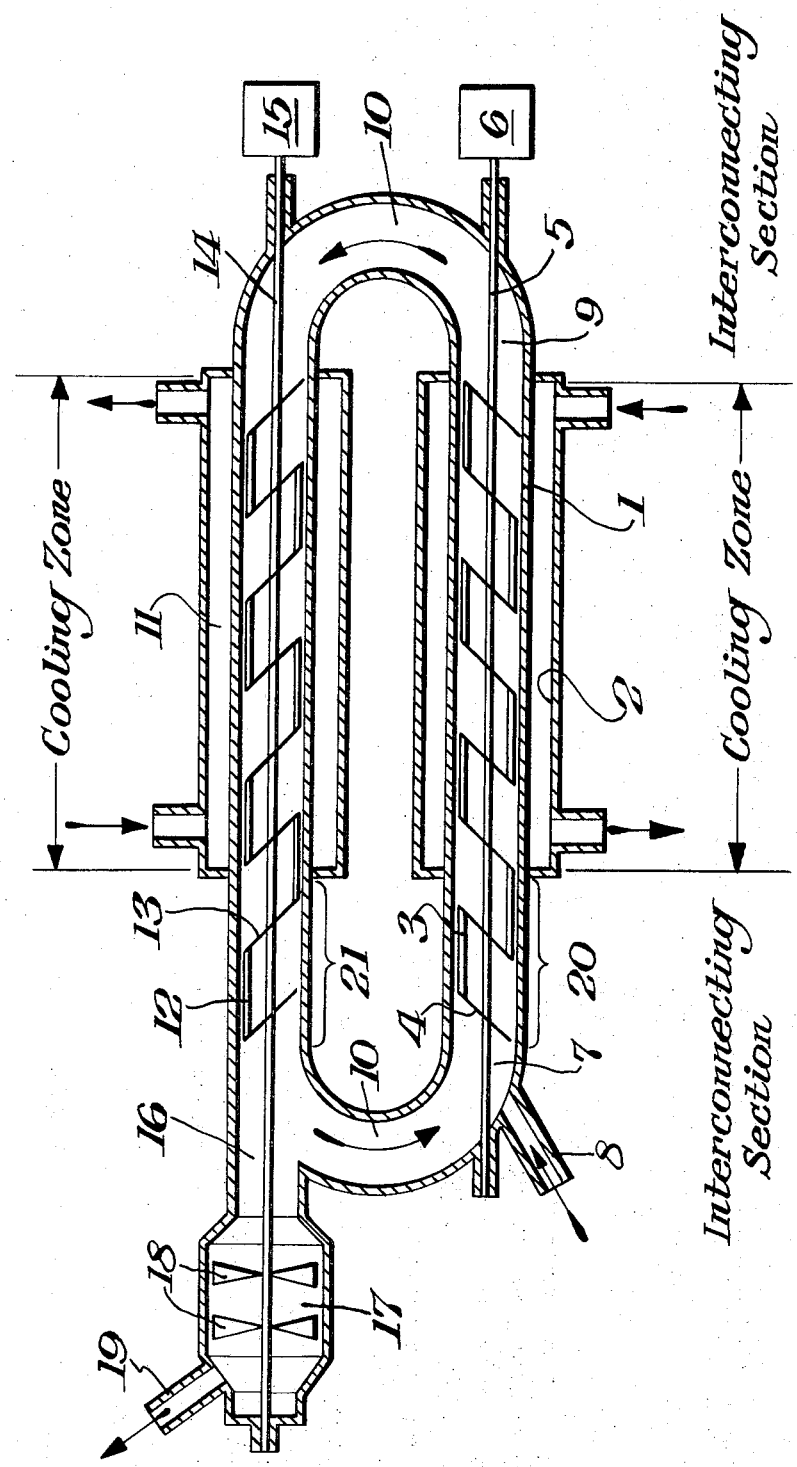

3,801,285

APPARATUS FOR RECEIVING CRYSTALS

CROSS-REFERENCE TO RELATED APPLICATION

This application is a continuation-in-part of copending application Ser. No. 853,737, filed Aug. 28, 1969, now abandoned.

BACKGROUND OF INVENTION

This invention relates to an apparatus for continuously recovering crystals from a melt or solution by indirect cooling.

It is frequently necessary in chemical engineering to convert a melt consisting of a crystallizable substance by cooling into the crystalline phase, with the additional requirement that the crystals formed should have a preselected, largely uniform, grain size.

If the grain size and grain size distribution are not of crucial importance, and if the melt is one which can be completely converted into the solid phase by cooling, it is often best from the economic point of view to cool the melt with the aid of a cooling roller.

Unfortunately, cooling rollers are not suitable for separating crystals from multiple-component systems by fractionation. To this end, it is known that the melt or solution to be treated can be continuously passed through an externally cooled tubular heat exchanger. Precautions have to be taken, by the provision of suitable fittings inside the heat exchanger, to ensure that the crystals, most of which settle on the wall of the heat exchanger, are continuously removed from it and carried along in the axial direction of the heat exchanger. These fittings may take the form, for example, of a screw conveyor whose threads extend to the inner surface of the heat exchanger. Scrapers suitably mounted on a rotating shaft are usually suitable for maintaining an effective transfer of heat, by removing the crystals formed from the externally cooled wall. The shaft with the scrapers mounted on it extend the entire length of the so-called scraper cooler. If the melt or the solution to be crystallized is passed through the cooler in a straight flow, it is usually very difficult to establish favorable crystallization conditions, such as uniform final temperature of the crystal paste, uniform solids concentration and a uniform grain size distribution of the crystallizate, as required for subsequent separation of the crystallizate from the mother liquor.

To obtain a substantially uniform coarse crystal grain during crystallization, it is imperative to guarantee an effective exchange of heat within the crystal paste. In addition the melt or solution to be crystallized must have an adequate residence time during crystallization, and a sufficiently large number of seed crystals must be present at the beginning of crystallization. Accordingly, apparatus have been developed which ensure that the material to be treated is vigorously circulated in the peripheral direction of the heat exchanger at those points where it enters the heat exchanger. In this way, material freshly introduced into the apparatus is thoroughly mixed with the crystals already present in the apparatus. In addition, it has been proposed to carry out crystallization in scraper coolers by recycling the crystal paste mix leaving the cooling zone, for example by means of a pump, back to the inlet end of the cooler through a return pipe, a quantity of the crystal paste corresponding to that of the fresh product introduced being removed from the system. The fresh product is fed into the circulating stream of the crystal paste so that a sufficient number of crystal seeds is guarantedd.

Although conventional systems are satisfactory in many instances, it has repeatedly been found in their practical application that difficulties are encountered in the really complete control of the crystallization process in them. In many instances, the contents of the apparatus as a whole freeze up. In addition, conventional apparatus usually requires additional pumps for keeping the fully crystallized substance moving, these pumps being particularly prone to freezing up and blockages. Finally, it is only possible in certain instances, using the conventional apparatus, to obtain a largely uniform crystal grain, a difficulty which becomes greater, the larger the required grain diameter.

Accordingly, there is a need for an apparatus for continuously recovering crystals from a melt or a solution by indirect cooling, in which, on the one hand, it is substantially certain that the apparatus will remain free from blockages and which, on the other hand, enables a crystalline product of substantially uniform composition to be obtained, even when the crystals have large diameters.

SUMMARY OF INVENTION

The present invention provides an apparatus for carrying out this process, which apparatus comprises one or more tubular heat exchangers adapted to be externally cooled having a feed pipe at one end thereof (the inlet end), and a discharge pipe at the other end thereof (the outlet end) with a pipe having a diameter of at least the same length as the diameter of the heat exchanger room connecting the outlet end to the inlet end, scraping means for scraping crystals from the walls of the heat exchanger and conveying means for conveying crystals through the heat exchanger, the scraping means and the conveying means being mounted on a common shaft. Since most of the already crystallized melt of solution is circulated together with the crystals separated, it is possible to make the tubular heat-exchanger larger in diameter, thus minimizing the danger of freezing in conjunction with the continuously circulating melt already in a state of equilibrium. The equilibrium between melt and crystals is only slightly upset by the introduction of the relatively small quantity of fresh material. Thus, the rate of flow of the crystal paste can be kept very much lower than is otherwise usual, without any danger of crystals being deposited from the residual mother liquor. This is also attributable to the fact that the means for conveying the crystal paste also mix and homogenize it at the same time. On the otherhand, it is ensured that there is always a sufficient number of seed crystals available for safely initiating crystallization of the mass introduced.

THE DRAWING

The invention is described in detail in the following with reference to the accompanying drawing, which is a diagrammatic longitudinal section through a simple embodiment of the novel apparatus.

DETAILED DESCRIPTION

It has proved to be of advantage that the diameter of the tubular heat exchanger can be adapted to the particular substance to be crystallized. The volume of the mass should be continuously introduced into the circuit in such a way that it is from one-thirtieth to one-half, preferably from one-tenth to one-fifth, of the volume circulating in the circuit in the same period. In some instances, especially when the quantities of crystallizable substance in the fresh product introduced are very large, it has proved to be of advantage to adjust the crystal concentration by adding a diluent, preferably mother liquor already separated off from the crystals, to the circulating mass. Slowly crystallizing substances require a relatively long residence time, so that in this instance the greatest possible ratio of volume to cooling area is desirable.

A screw mounted on the scraper shaft is suitable for conveying the crystal paste mix. The screw does not have to be arranged in one piece over the entire length of the tubular heat exchanger, instead it may be divided up into individual sections. Propeller-like fittings arranged at a suitable distance over the entire length of the shaft carrying the scrapers, may be used with equal effect. The arrangement according to the invention of scrapers and conveyor obviates the need for an additional recirculation pump. It also minimizes the number of stuffing boxes required for sealing the moving parts, which is particularly advantageous when crystallization is carried out at elevated temperatures and involves agressive substances.

It may be of advantage fo displace the first cooling zone of the apparatus away from the point at which the feed pipe opens, in the direction of flow of the material. The length of the resulting non-cooled zones may of course be adapted to the material to be crystallized. As a rule, it is from 5 to 25 percent of the overall length of the tubular heat exchanger. Ultrasmall crystals are fused in this part of the crystallizer so that it is mostly the relatively large crystal particles which continue to grow in the subsequent cooling zone. This promotes the desired narrow grain size distribution of the crystals in the crystallizate. Accordingly, it may be advisable to operate the first part of the crystallizer pipe adiabatically rather than with cooling. Depending upon the rate of crystallization, it may further be advisble to design the downstreams portion also of the tubular heat exchanger in the form of a non-cooled zone to enable the crystallizing material to continue crystallizing until the crystallization equilibrium is reached. The non-cooled leading and end zones may be formed in predetermined lengths, for example by means of pipe sections attached to the cooling zones. These measures contribute towards standardizing the crystal size distribution and increasing the size of the crystals formed. To enable the apparatus to be adapted, where desired, to different materials and systems of material, it may be of advantage to provide the crystallizer pipe with a flange for fitting extension pieces of any desired length between the point where the supply pipe opens and the beginning of the zone.

According to the invention, the return pipe closing the circuit can also be a crystallizer pipe, i.e., a tubular heat exchanger with a cooling jacket similar in design with the first mentioned earlier one. If required by the product, there may also be more than two tubular heat exchangers present, of which the outlet end of the first heat exchanger is joined to the inlet end of a following heat exchanger, whilst to close the circuit, the outlet end of the last heat exchanger is joined to the inlet end of the first heat exchanger through a pipe of large cross section. In this embodiment, it is not necessary for a conveyor to be associated with each scraper. The pipes connecting the end and the beginning of a single cooling zone or connecting several cooling zones with each other should be relatively short. Generally, the length of the connecting pipes should be no more than about the double of the total length of the cooling zones and in the case of a single cooling zone include the length of the non-cooled pipe parellel to said cooling zone. The diameter of the connecting pipes should be approximately the same or even greater than the diameter of the cooled pipes.

In order to be able accurately to measure the quantity of fresh material added and the amount of end product discharged quantity-control mechanisms known per se can be arranged in the feed pipe or discharge pipe. To ensure that the apparatus according to the invention operates reliably and that the required yield of crystallizate is obtained, the crystal paste concentration can be determined for example, by continuously measuring this viscosity of the circulating stream of crystal paste at the outlet end of the heat exchanger or can be directly determined from the power input of the motor. This can be done, because the resistance encountered by the rotating screw conveyor in the crystal mass will be greater, the higher the solids content of the crystal mass. This is accompanied by an increase in the current consumed by the driving motor, a quantity which is easily measured and which can be used for control purposes.

A quantity of the thoroughly crystallized product corresponding to the amount of product introduced is removed at any suitable point around the product circuit, preferably at a point as far away as possible from the product inlet, in the direction of circulation. A separator following the cooling system, for separating crystallizate from the mother liquor, for example in the form of a centrifuge, can be fed with the crystal paste. As a rule, the solids content will be not much more than 40 percent by weight. Accordingly, a considerable quantity of the mother liquor has to be returned to the apparatus according to the invention, following separation of the crystallizate. For example, this can be done by arranging a, preferably conical, screw conveyor in the outlet part of the cooling system and surrounding it with a perforated jacket which is permeable to the mother liquor but which does not allow the crystals to pass through. It is possible in this way to separate most of the mother liquor from the crystals when the crystal paste is discharged from the cooling system. All or part of the mother liquor squeezed out can be lead to the crystallizer circuit directly, optionally by means of a pump, without any appreciable change in temperature. In this connection, the screw for pressing the crystal paste may be attached to the same drive shaft that is used for carrying the crystal paste through the crystallizer and for scraping the crystals from the cooling surface. The crystallizate is then fed to the separator, for example a centrifuge, from the discharge end of the screw extruded by means of conveyors, most easily by means of a screw conveyor.

Referring now to the drawing, the apparatus comprises a tubular heat exchanger 1 which is surrounded by a cooling jacket 2. Inside the heat exchanger, scrapers 3 and a conveyor screw 4 are arranged on a shaft 5 which is axially rotated by a preferably controllable electric motor 6. In the example shown, the product inlet end of the tubular heat exchanger 1 is located at 7. Here a supply pipe 8, through which fresh material can be delivered in measured quantities, opens into the apparatus.

According to the invention, the product outlet end 9 is connected through a pipe 10 of large cross-section with the product inlet end 7 so that the aforementioned circuit can be established. In the embodiment shown, the pipe 10 is also in the form of a heat exchanger along part of its length and this section carries a cooling jacket 11 which operates in the same way as the aforementioned cooling jacket 2. Scrapers and conveyors 12 and 13 are mounted on a common shaft 14 driven by an electric motor 15 inside the pipe 10.

In the embodiment shown, the product outlet end of the closed pipe system is located at 16. It is designed in such a way that the pipe 10 continues for a short distance initially with unrestricted cross-section and then opens into a chamber 17 larger in cross-section than the pipe 10. In this chamber the crystal paste has enough time to ripen. To prevent the crystals from settling, and hence to avoid blockages, propellers 18 are arranged inside this chamber, being mounted on the same shaft 14 as the scrapers 12 and the conveyor 13 and driven by the same electric motor 15. The product ultimately emerges from a product discharge pipe 19.

The embodiment illustrated shows that the cooling jacket 2 is offset relative to the product inlet end 7 in the direction of flow. This provides an uncooled zone 20 in which there is a slight increase in temperature due to the fresh material flowing in at 8.

It has proved to be of advantage for the length of the uncooled zone 20 to be from 5 to 25 percent of the overall length of the heat exchanger 1.

The cooling jacket 11 does not extend up to the outlet end 16 either, but terminates before it so that this section of the apparatus, too, comprises an uncooled zone 21. The function of this zone is to complete crystallization of the substance before it leaves the circuit at 16.

The embodiment illustrated by way of example in the drawing is only a schematic form of an apparatus according to the invention which includes the essential features of the apparatus.

In an alternative arrangement cooling jacket 11 may be omitted whereby there would be only a single cooling zone. The pipe section diametrically opposed and parallel to cooling zone 2 and of equal length thereto is referred to as the parallel pipe section and the remaining interconnecting pipe section would have a collective length of no more than about double the length of the cooling zone and the parallel pipe section.

In a further arrangement wherein two cooling zones are used with two sets of interconnecting pipe sections, the longer of the two sets of pipe sections has a length about double the length of each cooling zone.

EXAMPLE

To recover pure p-xylene, a $C_8$-aromatic fraction containing 17 percent by weight of p-xylene was cooled to −75°C. in an apparatus according to the invention. Approximately 75 percent of the p-xylene crystallized out. The solids content of the crystal paste amounted to around 15 percent by weight. To separate the crystals from the mother liquor, the crystal paste was centrifuged and washed with part of the fused crystals obtained, after which the washing liquor was recycled to the apparatus for further crystallization. The crystallizate contained 82 percent by weight of p-xylene. It was crystallized after melting in a second similar apparatus. The crystal paste has a temperature of −17.5°C. At this temperature the mother liquor accumulating contained approximately 40 percent by weight of p-xylene. The crystallizate was removed by a conical screw arranged in the output section of the cooler. It was possible in this way to keep the crystal content of the circulating crystal paste at about 40 percent by weight without recycling mother liquor, whilst the solids content at the discharge end of the screw was from 70 to 75 percent by weight.

The crystal paste discharged from the screw was centrifuged. The crystals were washed in the usual way with part of the fused crystals. The washing liquor was returned to the second cooler for another crystallization, whilst the mother liquor was introduced into the first cooler. The crystals thus obtained contained 99.6 percent by weight of p-xylene. They had an average diameter of 0.4 mm with minimal variations above and below.

We claim:

1. An apparatus for continuously recovering crystals from a melt or solution by indirect cooling consisting of a closed pipe system incorporating only cooling zones as its thermal means, an inlet in said system for introducing a crystal paste thereto, at least two cooling zones downstream from said inlet, means for externally cooling said cooling zones, an outlet downstream from said cooling zones, at least one means for transporting the crystals through said closed pipe system and means for scraping the crystals off the pipe wall in said cooling zones, each of said transporting means and scraping means including a separate driving shaft, at least two sets of pipe sections interconnecting said cooling zones, and each of said pipe sections having a diameter at least as great as the diameter of said cooling zones and a length no more than about double the length of each cooling zone.

2. An apparatus as claimed in claim 1, wherein said interconnecting pipe sections have throughout their lengths larger diameters than said cooling zones.

3. An apparatus as claimed in claim 1, wherein at least a non-cooled part of an interconnecting pipe section containing means for scraping is immediately fitted close to a cooling zone.

4. An apparatus as claimed in claim 1, wherein said outlet has a chamber having a diameter greater as the diameter of the cooling zones, and said transporting means being propellers having its shaft extending into said outlet.

5. An apparatus for continuously recovering crystals from a melt or solution by indirect cooling consisting of a closed pipe system incorporating only cooling zones as its thermal means, an inlet in said system for introducing a crystal paste thereto, a first cooling zone downstream from said inlet, means for externally cooling said first cooling zone, a second cooling zone downstream from said first cooling zone, means for externally cooling said second cooling zone, an outlet downstream from said second cooling zone, conveying means for transporting the crystals through said closed pipe system and for scraping the crystals off the pipe walls in said cooling zones, said conveying means including a single separate driving shaft for each cooling zone, two sets of pipe sections interconnecting said cooling zones, and each of said pipe sections having a diameter at least as great as the diameters of said cooling zones and the longer of the two sets of pipe sections having a length about double the length of each cooling zone.

6. An apparatus as claimed in claim 5 wherein said outlet has a filtrate collecting chamber, and said conveying means being a screw extruder having its shaft extending into said outlet.

* * * * *